(12) United States Patent
McWilliams et al.

(10) Patent No.: US 11,914,581 B2
(45) Date of Patent: Feb. 27, 2024

(54) GRAPHIC SEARCH BAR WITH RESPONSIVE RESULTS

(71) Applicant: Microsoft Technology Licensing, LLC, Redmond, WA (US)

(72) Inventors: Laralyn McWilliams, Seattle, WA (US); Alberto Cerriteno Avendano, Kirkland, WA (US); Jennifer Laurie Shetterly, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/838,604

(22) Filed: Jun. 13, 2022

(65) Prior Publication Data
US 2023/0401202 A1 Dec. 14, 2023

(51) Int. Cl.
*G06F 16/00* (2019.01)
*G06F 16/242* (2019.01)
*G06F 16/2457* (2019.01)
*G06F 16/248* (2019.01)

(52) U.S. Cl.
CPC ...... *G06F 16/2428* (2019.01); *G06F 16/2457* (2019.01); *G06F 16/248* (2019.01)

(58) Field of Classification Search
CPC . G06F 16/2428; G06F 16/2457; G06F 16/248
USPC .............................................. 707/600–899
See application file for complete search history.

(56) References Cited

U.S. PATENT DOCUMENTS

| | | | |
|---|---|---|---|
| 10,057,373 B1* | 8/2018 | Chang | H04L 67/63 |
| 2006/0095835 A1* | 5/2006 | Kennedy | G06Q 30/06 |
| | | | 715/764 |
| 2008/0313146 A1* | 12/2008 | Wong | G06F 16/78 |
| 2012/0078896 A1 | 3/2012 | Nixon et al. | |
| 2016/0026717 A1 | 1/2016 | Kelsey et al. | |
| 2016/0162582 A1* | 6/2016 | Chatterjee | G06F 16/248 |
| | | | 707/706 |
| 2017/0091883 A1* | 3/2017 | Greystoke | G06Q 50/14 |
| 2018/0260749 A1* | 9/2018 | Staugaard | G06F 16/248 |
| 2022/0292156 A1* | 9/2022 | Gustavson | G06F 16/9538 |
| 2022/0342962 A1* | 10/2022 | Gallagher | G06F 21/16 |

OTHER PUBLICATIONS

"Reactive User Interface", Retrieved from: https://en.wikipedia.org/w/index.php?title=Reactive_user_interface&oldid=1090632889, May 30, 2022, 1 Page.
"International Search Report and Written Opinion Issued in PCT Application No. PCT/US23/019053", dated Jul. 12, 2023, 10 Pages.

* cited by examiner

*Primary Examiner* — Michelle N Owyang (57) ABSTRACT

In non-limiting examples of the present disclosure, systems, methods, and devices for a graphic search bar with responsive results is provided. A search bar may be generated. The search bar may include a text input area and a number of dropdown menus, each of which contain a selectable list of options. The search bar may be rendered in an application user interface that provides content options that are searchable using the search bar. A selection of an option from a first of the dropdown menus may be received. In response to receiving the selection, the content options may be filtered in real time based on the selected option to generate search results. The search results may be rendered for immediate display to the user.

20 Claims, 9 Drawing Sheets

GRAPHIC SEARCH BAR WITH RESPONSIVE RESULTS

BACKGROUND

Vast amounts of content are available to users. Because of the sheer volume of content, users often use search bars to find desired content. Search bars are helpful, but even with searching, users often struggle to find desired content. Traditional searching involves keyword searches, which may or may not return results that are helpful to the user. To use keyword searches, the user needs to produce the proper words to successfully search, which is sometimes difficult. Especially when searching visual content, textual searching may leave the user unsure what to enter to obtain desired results. It is with this general framework in mind that the following disclosure is provided.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for providing a responsive searching environment. The method may include generating a search bar. The search bar may include a text input area and multiple dropdown menus. Each dropdown menu may include a selectable list of options. The method may also include rendering the search bar in an application that provides content options that are searchable using the search bar. The method may also include receiving a selection of a first option from the selectable list of options from a first of the dropdown menus. In response to receiving the selection, the method may also include filtering the content options in real time based on the first option to generate search results and rendering the search results for immediate display to a user. Other embodiments of this aspect include corresponding computer systems, apparatus, and computer programs recorded on one or more computer storage devices, each configured to perform the actions of the methods.

Implementations may include one or more of the following features. The computer-implemented method may include receiving a second selection of a second option from the selectable list of options from a second of the dropdown menus. In response to receiving the second selection, the method may also include filtering the search results in real time based on the second option to generate updated search results and rendering the updated search results for immediate display to the user. In some embodiments, the content options are templates. In some embodiments, the dropdown menus may include a first dropdown menu that includes a selectable list of platform options, a second dropdown menu that includes a selectable list of style options, and a third dropdown menu that includes a selectable list of color scheme options. In some embodiments, the computer-implemented method may include populating at least one of the dropdown menus using artificial intelligence (AI) to customize the search bar for the user. In some embodiments, the computer-implemented method may include receiving user configurations and populating at least one of the dropdown menus using the user configurations. The user configurations may include the options for the selectable list of options. In some embodiments, the computer-implemented method may include providing the user configurations to an artificial intelligence (AI) system, receiving options for the selectable list of options as output from the AI system, and using the options for the selectable list of options to populate the at least one of the dropdown menus. In some embodiments, the computer-implemented method may include modifying, in real time, the background of a displayed page of the application based on the selection of the first option. In some embodiments, each of the dropdown menus may include a type, and the type of each of the dropdown menus may be user configurable. In some embodiments, each of the dropdown menus may include a type, and the method may include using output from an artificial intelligence (AI) system to select the type for each of the dropdown menus. Implementations of the described techniques may include hardware, a method or process, or computer software on a computer-accessible medium.

BRIEF DESCRIPTION OF THE DRAWINGS

Many aspects of the disclosure can be better understood with reference to the following drawings. The components in the drawings are not necessarily drawn to scale. Some components or operations may not be separated into different blocks or may be combined into a single block for the purposes of discussion of some embodiments. Moreover, in the drawings, like reference numerals designate corresponding parts throughout the several views. While several embodiments are described in connection with these drawings, the disclosure is not limited to the embodiments disclosed herein. The technology is amenable to various modifications and alternative forms. The disclosure and figures herein are intended to provide a description of certain embodiments, and the intent is to cover all alternatives, modifications, and equivalents.

DETAILED DESCRIPTION

This disclosure is generally related to providing a graphic search bar with responsive results. Because vast amounts of content exist, users must search for what they desire to narrow the options before browsing. However, textual search bars require knowledge of the correct key words and other information the user may not easily produce. Existing filters are often not user friendly. For example, a page full of text with check boxes or other selection methods are difficult for a user to visualize. This is particularly true for users searching content that is visually important. For example, templates for design purposes have many visual components that are difficult to describe purely textually. Accordingly, visual cues are helpful to users.

Aspects of the current disclosure include graphic search bars that provide real time responsive results. Applications that provide content may incorporate such search bars to enhance the application and allow the user to more easily obtain the desired content. The search bar may include multiple dropdown, visual menus that, once selected, filter the content options in real time. The dropdown menus and the selection options within may be generated based on the specific user. For example, artificial intelligence (AI) systems may be used to select the dropdown menus and populate the dropdown menus based on known information about the user and about similar users. As an example, a design application (e.g., Designer Hub from Microsoft®) may have a template feature. There may be hundreds of templates, and the graphic search bar can be used to allow the user to obtain the desired content quickly. For example, a first dropdown menu may allow the user to select the type of content the user would like to design. The user may select a platform type such as a social media posting and type, an application and type, and so forth. For example, the user may select a Pinterest® pin, a resume in Word® or the like. An AI system may be used to select the options presented and the order of the options in the dropdown menu. For example, the user's past use and currently open applications may be used to inform the AI system on the best options to prioritize in the dropdown menu for that user. Additionally, information known about the user may allow the AI system to categorize the type of user and use information from other users in the same category to inform the AI system on the best options to prioritize in the dropdown menu for that user. Returning to our example, immediately after selection of, for example, the content type, the template options may be filtered for the user to view templates of the selected type. Additional dropdown menus may include other filtering options that cumulatively filter the search results in real time to allow the user to quickly narrow to an option that suits the user's needs.

In addition to providing real time, cumulative filtering, the user's selections may change the overall environment of the page on which they are viewing the results. For example, selection of a color scheme may change the header and other background colors to match the selected color scheme of the entire page as well as the content options. Other features may also include using an AI system to generate content that matches the user's selections that did not previously exist. For example, a user may select a type of content (e.g., presentation), with a style (e.g., modern), and a color scheme (e.g., blues). The AI system may recognize that the user is, for example, a doctor or works in a doctor office. While there may not exist templates for doctors that are presentations with a modern style and blue color scheme, the AI system may use existing content for doctors, existing content with modern style, and existing content with blue color schemes and generate new content that meets the criteria.

Figure 1:
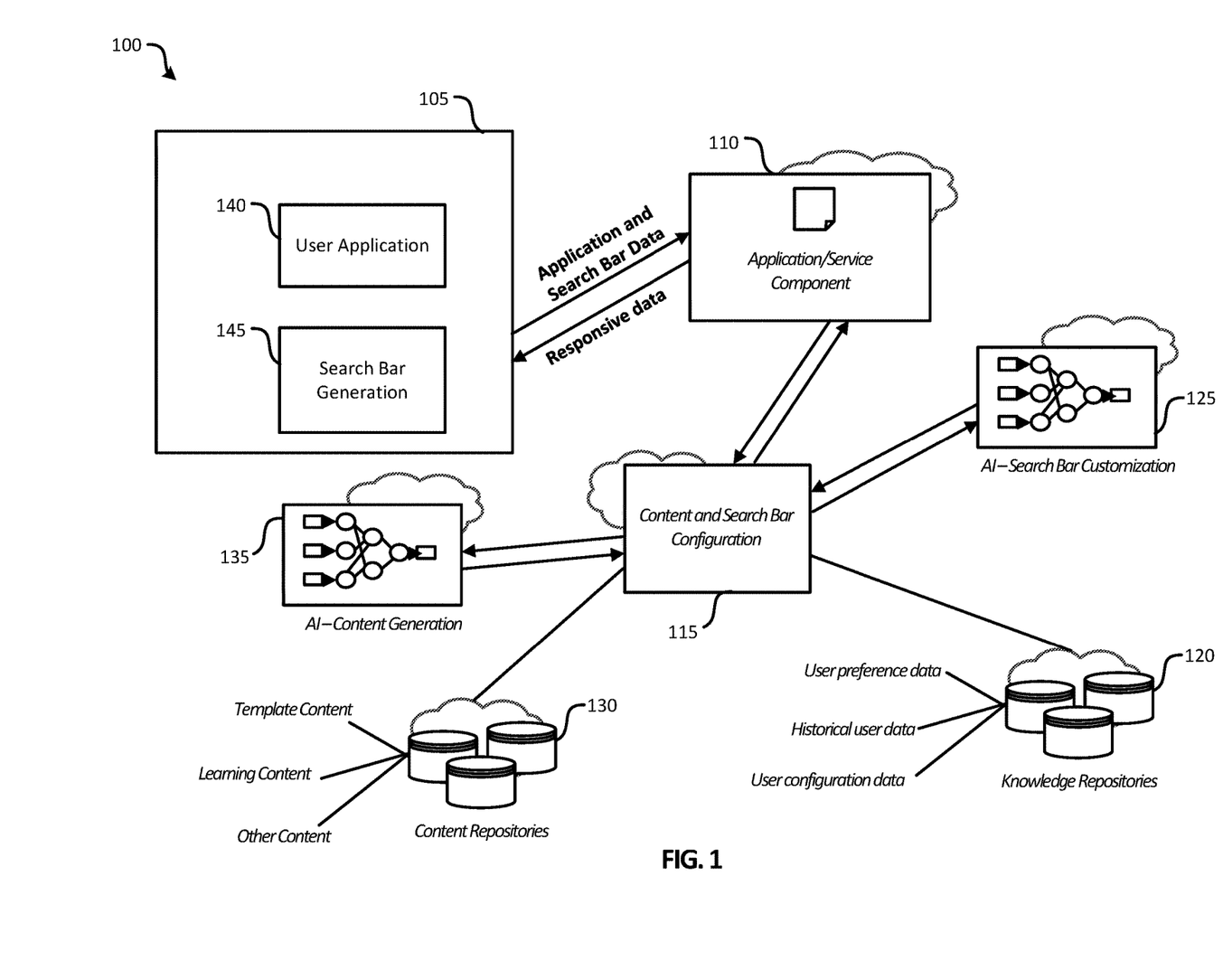
FIG. 1 illustrates an exemplary system for providing a graphic search bar with responsive results, according to some embodiments.

FIG. 1 illustrates an exemplary system 100 for providing a graphic search bar with responsive results. System 100 may include user equipment 105, an application/service component 110, a content and search bar configuration component 115, knowledge repositories 120, artificial intelligence (AI) search bar customization 125, content repositories 130, and AI content generation 135. System 100 may include additional components not shown here for clarity including, for example, additional servers for performing other services not described here. Further, system 100 may include fewer components as the functionality described may be consolidated into fewer components.

User equipment 105 may be any user device including, for example, a desktop computer, a laptop computer, a mobile computing device such as a smart phone, or the like. User equipment 105 may be computing system 800 as described with respect to FIG. 8 and/or general computing device 904, tablet computing device 906, or mobile computing device 908 as described with respect to FIG. 9. User equipment 105 may include user application 140 and search bar generation 145. The search bar generation 145 may be incorporated into user application 140 or exist as a separate component that is called by user application 140. The user application 140 may be any user application 140 in which a graphic search bar with responsive results may be useful. Any application that provides content that may be searched could use the search bar generation 145. For example, Designer Hub by Microsoft® or any other application that provides learning content, design templates, or any other content. In the embodiment shown, user application 140 may be a cloud-based application such that user application 140 provides a local user interface on the user equipment 105 for the user to interact with. In some embodiments, the user application 140 may be a locally hosted application. Search bar generation 145 may be the component on the user equipment 105 that generates the responsive search bar with responsive results. The search bar generation 145 in this depicted embodiment of FIG. 1 is a locally hosted portion for rendering the search bar and displaying it to the user, while the information processing is handled in a cloud-based distribution. However, in some embodiments, the search bar generation 145 may be fully locally hosted. The user application 140 may utilize the search bar generation 145 to provide a graphic search bar with responsive results in a user interface, such as the user interface 400 as depicted and described with respect to FIGS. 4-7. Search bar generation 145 and user application 140 may provide data to the application/service component 110 for cloud-based hosting of the user application 140 and for obtaining the data to render the graphic search bar with responsive results.

Application/service component 110 may be the cloud-based interface for interacting with the online services for the user application 140 and the graphic search bar. Application/service component 110 may be any server or computing system. Application/service component 110 may be computing system 800 as described with respect to FIG. 8 and/or server 902 as described with respect to FIG. 9. In some embodiments, there may be an application/service component 110 for the user application 140 and one for the search bar generation 145. The application/service component 110 provides the data obtained from the user equipment 105 to content and search bar configuration 115.

Content and search bar configuration 115 determines where to send the data to obtain the proper results for distribution back to the user equipment 105. Content and search bar configuration 115 may be hosted on any server or computing system. Content and search bar configuration 115 may be hosted on, for example, computing system 800 as described with respect to FIG. 8 and/or server 902 as described with respect to FIG. 9. In some embodiments, application/service component 110 and content and search bar configuration 115 are hosted from a single server. In other embodiments they are each hosted from multiple distributed servers. Content and search bar configuration 115 may receive data indicating user selections, other user data, application data, and the like from application/service component 110. Content and search bar configuration 115 may obtain other relevant data from content repositories 130 and knowledge repositories 120 and generate inputs for AI content generation 135 or AI search bar customization 125 if needed or may generate responsive data for transmitting back to the user equipment 105 via application/service component 110. For example, content and search bar configuration 115 may obtain data from the application/service component 110 that a user is searching for templates for Pinterest® pins for wedding materials having blue color schemes. Content and search bar configuration 115 may generate a search for matching templates in the content repositories 130. In some embodiments, content and search bar configuration 115 may obtain additional data about the user from the knowledge repositories 120. In some embodiments, content and search bar configuration 115 may generate input into AI content generation 135 to generate additional content for the user given the user's information, existing content from the content repositories 130, and the user's selections. For example, after searching the content repositories 130 for Pinterest® pin templates related to weddings with a blue color scheme, content and search bar configuration 115 may determine the number of content items returned is insufficient. Content and search bar configuration 115 may generate an input to AI content generation 135 to generate additional content meeting the criteria using existing content having blue color schemes, wedding themes, or Pinterest® pins. Content and search bar configuration 115 may transmit the results from the content repositories 130 and any generated content from AI content generation 135 to the application/service component 110 for responding to the user equipment 105 for the user application 140 to render. As another example, content and search bar configuration 115 may receive an indication that the user of user equipment 105 is launching user application 140 and the search bar generation 145 needs to obtain and render a graphic search bar. Content and search bar configuration 115 may obtain additional information stored in the knowledge repositories 120 either known about the user or generally about user's that perhaps meet similar criteria known about the user. For example, the user may be in a Starbucks during the middle of a Tuesday in Chicago, which may provide some information relevant enough to classify the user. The obtained information may be used to generate input to AI search bar customization 125. The results from the AI search bar customization 125 may include the dropdown menus for the search bar and/or the options used to populate the dropdown menus. The results may be processed by content and search bar configuration 115 for generating responsive data the user equipment 105 can use to generate the graphic search bar after receiving it from application/service component 110.

Knowledge repositories 120 may be any one or more suitable storage devices for storing user data. Knowledge repositories 120 may include, for example, store 916 as described with respect to FIG. 9. Knowledge repositories 120 may contain user preference data, historical user data, user configuration data, and the like. Knowledge repositories 120 may additionally include generalized user information such that users may be classified into groups, and general information may be used to characterize the users in the knowledge repositories 120 to maintain privacy. In some embodiments, user's may opt out (or may have to opt in) to have their data stored in knowledge repositories 120. While not shown, a classification AI system may be included to classify users based on information known about the user at the time of use of system 100, for example, thereby avoiding storage of specific user information. In some embodiments, user information may include content generated by the user or other known user information stored by the user. For example, the user may use tools to generate a logo, a custom color scheme, or other customizations for a user or their business. In such embodiments, the user's logo, color scheme, and customizations may be stored and used to customize the user's experience.

Content repositories 130 may be any suitable storage devices for storing content. Content repositories 130 may include, for example, store 916 as described with respect to FIG. 9. Content repositories 130 may contain template content, learning content, or any other type of content that may be searched in user application 140 by a graphic search bar generated by search bar generation 145.

AI search bar customization 125 may be an AI system including AI models, a neural network, or the like. AI search bar customization 125 may be implemented on a server or other computing device such as computing system 800 as described with respect to FIG. 8 and/or server 902 as described with respect to FIG. 9. AI search bar customization 125 may be used to generate the graphic search bar intelligently and automatically by selecting the type of dropdown menus to include for the user and/or by populating the dropdown menus with options customized to the user. The input may include user information about the specific user received from user equipment 105, obtained from knowledge repositories 120, and/or user information obtained about similar users (e.g., users classified similarly) from, for example, knowledge repositories 120. The output may include a number of dropdown menus to include in the search bar, the type of one or more of the dropdown menus to include in the search bar, the options with which to populate one or more of the search bars, the order to put the options into the dropdown menus, and so forth.

AI content generation 135 may be an AI system including AI models, a neural network, or the like. AI content generation 135 may be implemented on a server or other computing device such as computing system 800 as described with respect to FIG. 8 and/or server 902 as described with respect to FIG. 9. AI content generation 135 may be used to generate content intelligently and automatically for users. The input may include known content, information about the user or a class of users the user fits into, the user's search criteria, and so forth. The output may include one or more new content items generated based on the input. For example, if a user requests business presentation templates having a yellow color scheme, and the user is known to be a dentist, AI content generation 135 may use existing content for dentists, existing content with yellow color schemes, and/or existing business presentation templates to generate new content meeting the criteria. Further, user customizations may be used to further generate new content. If a user has created a logo, the logo may be inserted into at least some of the returned content for that user. The generated content may be stored in content repositories 130 for future use.

In use, a user may launch user application 140 on user equipment 105. User application 140 may have search bar generation 145 incorporated or call it as a separate component. The data associated with launching the application may be transmitted to application/service component 110 and transferred to content and search bar configuration 115. Content and search bar configuration 115 may obtain additional data about the user or the class of users the user belongs to from knowledge repositories 120. Content and search bar configuration 115 may generate input for AI search bar customization 125 using the information from application/service component 110 and data gathered from knowledge repositories 120. Content and search bar configuration 115 may process the output of AI search bar customization 125 to provide instructions for rendering the search bar. For example, default settings may be configured for rendering the search bar, but AI search bar customization may provide modified instructions for a given user based on user preferences, historical data about the user, or information about the class of users in which the user fits. For example, AI search bar customization 125 may provide instructions to prioritize the color schemes of navy blue and canary yellow for the given user such that the color scheme dropdown menu contains those options near the top. As another example, AI search bar customization 125 may use information about the user, such as age (e.g., under 25) and location (e.g., coffee shop in Manhattan) to determine social media postings are likely important to the user. Accordingly, AI search bar customization 125 may provide instructions to prioritize template listings to automatically show templates for social media types and not provide a content type dropdown menu but instead include a theme dropdown menu, for example. Content and search bar configuration 115 may also obtain content from content repository 130 to initially populate the user application 140. In some embodiments, the content may be selected based on known information about the user to provide options the user may likely find useful. For example, knowing the user is a teacher, content and search bar configuration 115 may prioritize lesson plan templates and other educational materials in the initial display of content. Additionally, if a user has generated content or saved customizations such as logos, that information may be used to customize the initially provided content using their color scheme and logo, for example, as well as the general environment of the rendered user interface. The content and search bar rendering instructions are then sent to application/service component 110 for sending to the user equipment 105. Upon receipt, user application 140 and search bar generation 145 use the information to render the search bar, provide initial content to the user, and otherwise customize the searching environment with the user's customizations if applicable upon launching the user application 140. In some embodiments, the user application 140 is launched with default settings without accessing the cloud-based component. In some embodiments, on initial launch, user application 140 may obtain initial content from a local source and/or directly search content repositories 130. Once launched, the user may input selections for proceeding. For example, the user may select one or more dropdown menu options from the search bar. Upon selection, the selection information is immediately transmitted to application/service component 110 and passed to content and search bar configuration 115 to obtain results in real time (i.e., as immediately as possible). In some embodiments, user application 140 may filter local results immediately to render filtered results in real time while additional content filtering is performed by content and search bar configuration 115. Content and search bar configuration 115 may use the selection information to filter the content by, for example, performing a search on the content repositories 130 using the search criteria. In some embodiments, the search results may be stored for future use. In some embodiments, content and search bar configuration 115 may use the selection and other user information as input to AI content generation 135 for generating new content to return to the user. The filtered content may be provided to the user application 140 via application/service component 110. Additional selections by the user may also be transmitted to content and search bar configuration 115 to cumulatively filter the content for the user and/or be used to generate more specific content the user may like with AI content generation 135.

Figure 2:
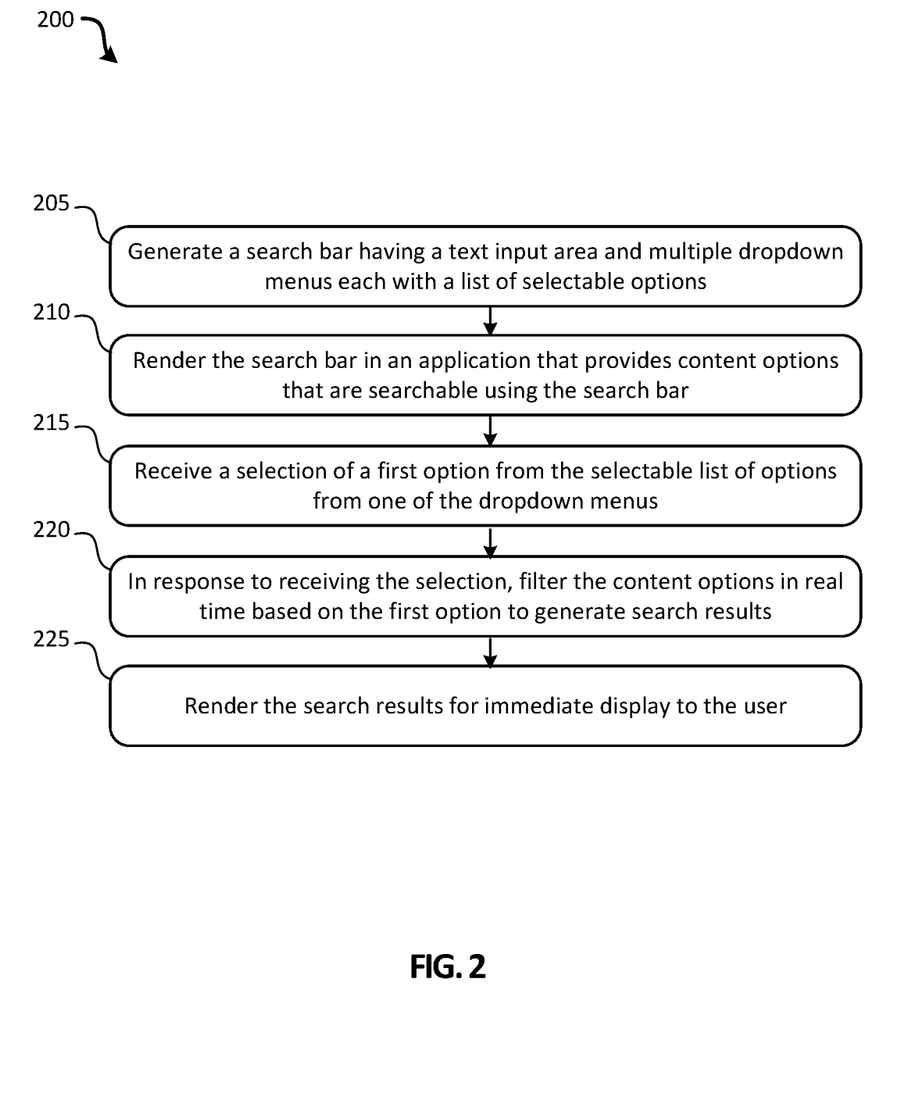
FIG. 2 illustrates an exemplary method for providing a graphic search bar with responsive results, according to some embodiments.

FIG. 2 illustrates a method 200 for providing a responsive searching environment. Method 200 may be performed by system 100 as described with respect to FIG. 1. Method 200 begins at step 205 with a component generating a search bar having a text input area and multiple dropdown menus each with a list of selectable options. For example, content and search bar configuration 115 may generate the instructions for rendering the search bar. In some embodiments, content and search bar configuration 115 may use AI search bar customization 125 to generate at least portions of the search bar. In some embodiments, search bar generation 145 may generate the search bar locally without accessing cloud-based components.

At step 210, the search bar is rendered in an application that provides content options that are searchable using the search bar. For example, search bar generation 145 may render the search bar within user application 140. The search bar can be used to search content available in user application 140.

At step 215, a selection of a first option from the selectable list of options from one of the dropdown menus is received. For example, a user may select an option from a dropdown menu, which generates an indication of the selection.

At step 220, in response to receiving the selection, search results are generated by filtering the content options in real time based on the first option. For the purposes of this application, real time means that immediately upon receipt of the selection, the filtering process begins to provide the results as fast as possible for the user. For example, search bar generation 145 or user application 140 may receive the selection and transmit the selection to application/service component 110, which passes the indication to content and search bar configuration 115, for example. In response to receiving the indication, content and search bar configuration 115 immediately filters results from content repositories 130 based on the selection to generate search results. The search results are returned to the user application 140. In some embodiments, user application 140 may search content repositories 130 without using content and search bar configuration 115. In some embodiments, an initial repository is stored on the user equipment in memory and is filtered based on the selection and initial results are provided immediately while the content repository 130 is searched by either user application 140 or content and search bar configuration 115 and the remaining results are obtained.

At step 225, the search results are rendered for immediate display to the user. For example, user application 140 immediately updates the content options with the search results for the user to browse and/or select to use. In some embodiments, as described above, the results may not all return at once. In such cases, the results are rendered as they are received.

Figure 3:
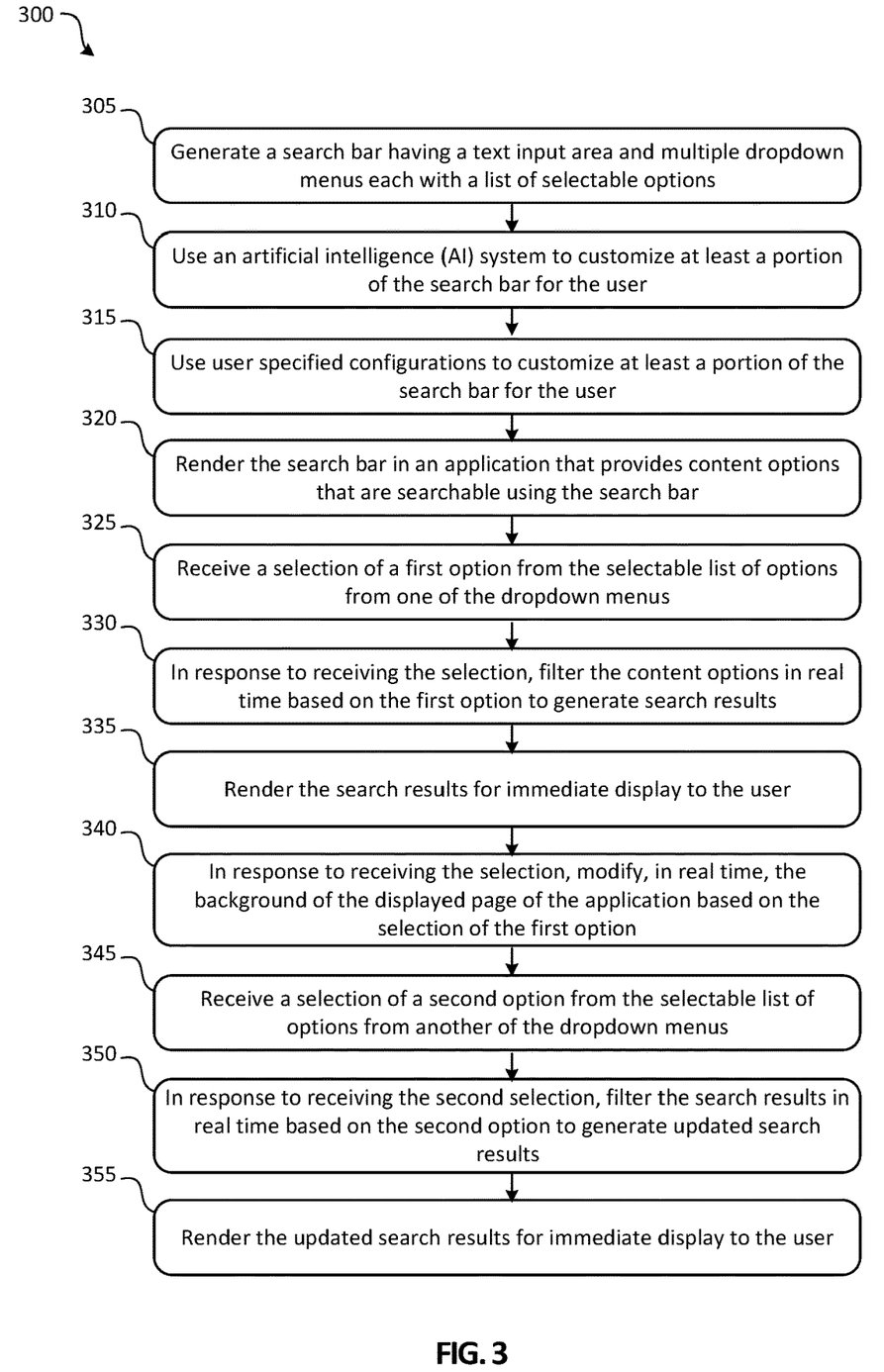
FIG. 3 illustrates another exemplary method for providing a graphic search bar with responsive results, according to some embodiments.

FIG. 3 illustrates a method 300 for providing a responsive searching environment. Method 300 may be performed by system 100 as described with respect to FIG. 1. Method 300 provides many optional steps beyond the steps discussed in method 200. Every step of method 300 is not required to provide a responsive searching environment, but many steps may be omitted, repeated multiple times, or otherwise performed in differing order without departing from the scope of the present disclosure. Method 300 begins at step 305 with a component generating a search bar having a text input area and multiple dropdown menus each with a list of selectable options. For example, content and search bar configuration 115 may generate the instructions for rendering the search bar.

At step 310, the component uses an AI system to customize at least a portion of the search bar for the user. For example, content and search bar configuration 115 may use AI search bar customization 125 to generate at least portions of the search bar including the number of dropdown menus, the type of one or more dropdown menus, or the selection options within one or more of the dropdown menus.

At step 315, the component uses user specified configurations to customize at least a portion of the search bar for the user. For example, the user may manually select one or more of the dropdown types. As another example, the user may provide favorites information, which may be used for populating the dropdowns favoring the user's favorites to appear higher in the dropdown lists.

At step 320, the search bar is rendered in an application that provides content options that are searchable using the search bar. For example, search bar generation 145 may render the search bar within user application 140. The search bar can be used to search content available in user application 140.

At step 325, a selection of a first option from the selectable list of options from one of the dropdown menus is received. For example, a user may select an option from a dropdown menu, which generates an indication of the selection.

At step 330, in response to receiving the selection, search results are generated by filtering the content options in real time based on the first option. For the purposes of this application, real time means that immediately upon receipt of the selection, the filtering process begins to provide the results as fast as possible for the user. For example, search bar generation 145 or user application 140 may receive the selection and transmit the selection to application/service component 110, which passes the indication to content and search bar configuration 115. In response to receiving the indication, content and search bar configuration 115 immediately filters results from content repositories 130 based on the selection to generate search results. The search results are returned to the user application 140. In some embodiments, the user application 140 may search content repositories 130 without using content and search bar configuration 115. In some embodiments, an initial repository is stored on the user equipment in memory and is filtered based on the selection and initial results are provided immediately while the content repository 130 is searched by either user application 140 or content and search bar configuration 115 and the remaining results are obtained.

At step 335, the search results are rendered for immediate display to the user. For example, user application 140 immediately updates the content options with the search results for the user to browse and/or select to use. In some embodiments, as described above, the results may not all return at once. In such cases, the results are rendered as they are received.

At step 340, in response to receiving the selection, the background of the displayed page of the application is modified, in real time, based on the selection of the first option. For example, the displayed page of the user application 140 may be modified based on the selection to provide a complete environment meeting the selection criteria. For example, if a color scheme or style is selected, the background and header text, colors, and other design may be changed to match the selected scheme or style.

At step 345, a selection of a second option from the selectable list of options from a second one of the dropdown menus is received. For example, a user may select an option from another dropdown menu, which generates an indication of the second selection.

At step 350, in response to receiving the second selection, updated search results are generated by filtering the first search results in real time based on the first option. For example, user application 140 may further filter the first search results based on the second option. The first search results may be stored locally or be stored in content repositories 130 that may be directly accessed, in some embodiments. In some other embodiments, search bar generation 145 or user application 140 may receive the selection and transmit the selection to application/service component 110, which passes the indication to content and search bar configuration 115, for example. In response to receiving the indication, content and search bar configuration 115 immediately filters the previously obtained search results, which may have been stored. The updated search results are returned to the user application 140.

At step 355, the updated search results are rendered for immediate display to the user. For example, user application 140 immediately updates the search results with the updated search results for the user to browse and/or select to use.

Figure 4:
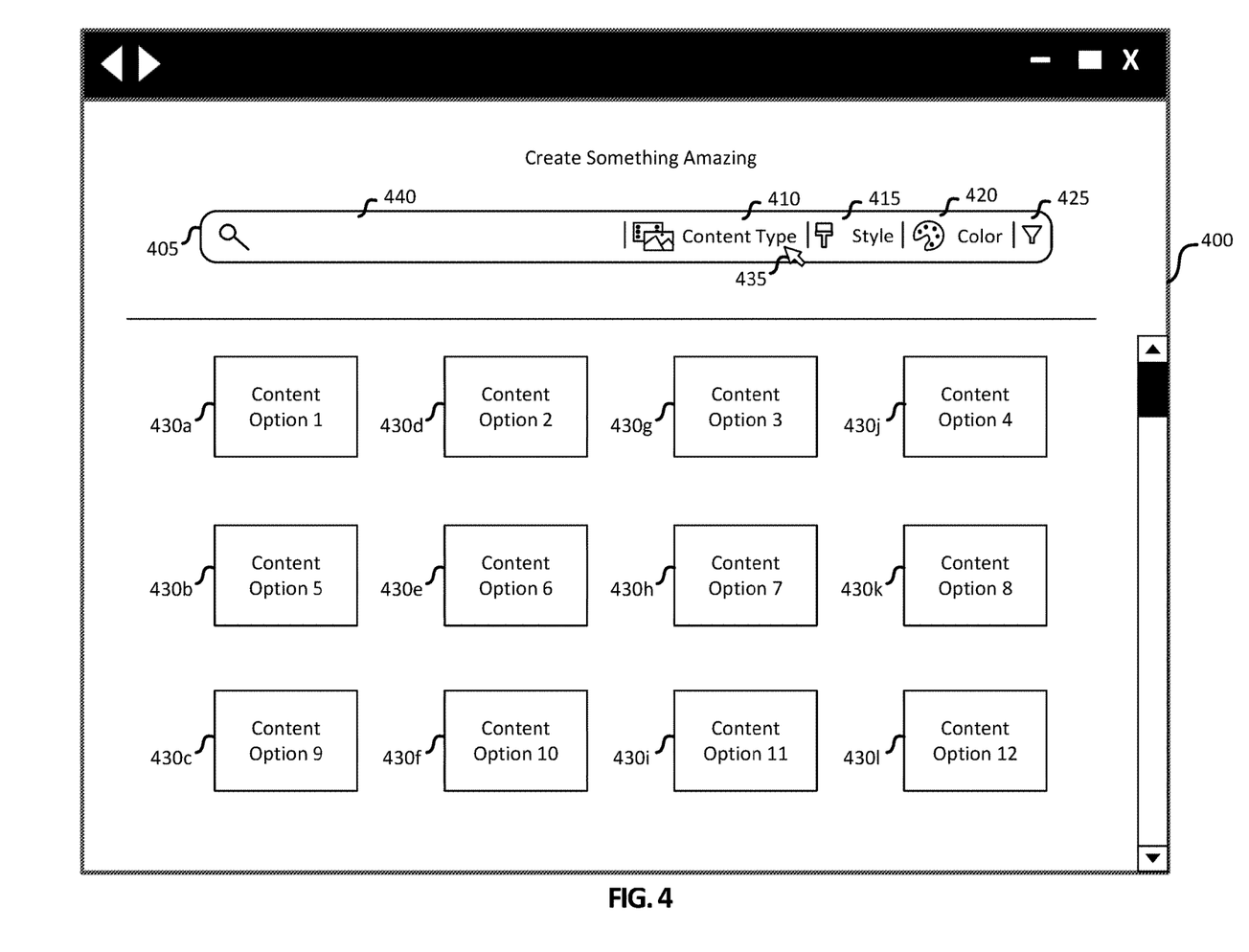
FIG. 4 illustrates an exemplary user interface incorporating a graphic search bar with responsive results, according to some embodiments.

FIG. 4 illustrates an exemplary user interface 400. The user interface 400 may be from, for example, user application 140. The user interface 400 includes a responsive search bar 405 and content options 430. The user application may be for designing content, for example, and templates are provided as starting points for the user. The content options 430 may be templates for a user to use to begin their design. Upon launching the user application, the search bar 405 may be generated and the initial content options 430 obtained for rendering in the user interface 400. The search bar and content for rendering may be generated by, for example, content and search bar configuration 115 as described with respect to FIG. 1. As shown in FIG. 4, the search bar 405 includes a text input area 440, multiple dropdown menus 410, 415, 420, and a general filtering option 425. The dropdown menus 410, 415, 420 include content type dropdown menu 410, style dropdown menu 415, and color dropdown menu 420. While there are three dropdown menus shown, any number of dropdown menus may be included in search bar 405. Further, the type of dropdown menus may differ. For example, the user may configure preferred options for the dropdown menus, one or more components (e.g., content and search bar configuration 115 and AI search bar customization 125) may select the type of dropdowns and/or their selectable options, or a different number or type of dropdown menus may be coded into the search bar 405. As an example, for learning material, dropdown types may include format (e.g., blog, short video, long video, tutorial, interactive), duration, platform (e.g., YouTube®, specific websites, etc.), and so forth. The text input area 440 may filter the search results based on a keyword search that may be performed on the content options 430. For example, content options 430 may be stored locally or in a remote repository and the keyword selection may filter the options. Additionally, the dropdown menu selections may filter the content options 430 in real time as previously described. The general filter 425 may include, for example, a standard text with checkbox filtering mechanism as a fallback for additional criteria. Each dropdown menu 410, 415, 420 provides immediate filtering of the content options based on selection of an option within the dropdown menu as shown in more detail in the following figures. The user may select the dropdown menu by clicking or hovering over a dropdown menu with selection arrow 435. As shown, selection arrow 435 may select content type dropdown menu 410. The location of the search bar 405, the content options 430, and every other depicted item on the user interface 400 may be modified and still provide the functionality within the spirit of the present disclosure. For example, the search bar 405 may be located at the bottom, side, or any other location on the user interface 400. Further, the application could be, for example, a general searching tool for web-based content. For example, a content (e.g., video game) could be selected from a dropdown menu, a type (e.g., news) of content could be selected from a second dropdown menu, a recency (e.g., within last 24 hours) could be selected from a third dropdown menu, and "console" could be typed into the text input area 440 to obtain console video game news published within the last 24 hours, for example. Also, the user may be able to configure the dropdown menus 410, 415, 420 to make the search bar even more functional for general search bar use.

Figure 5:
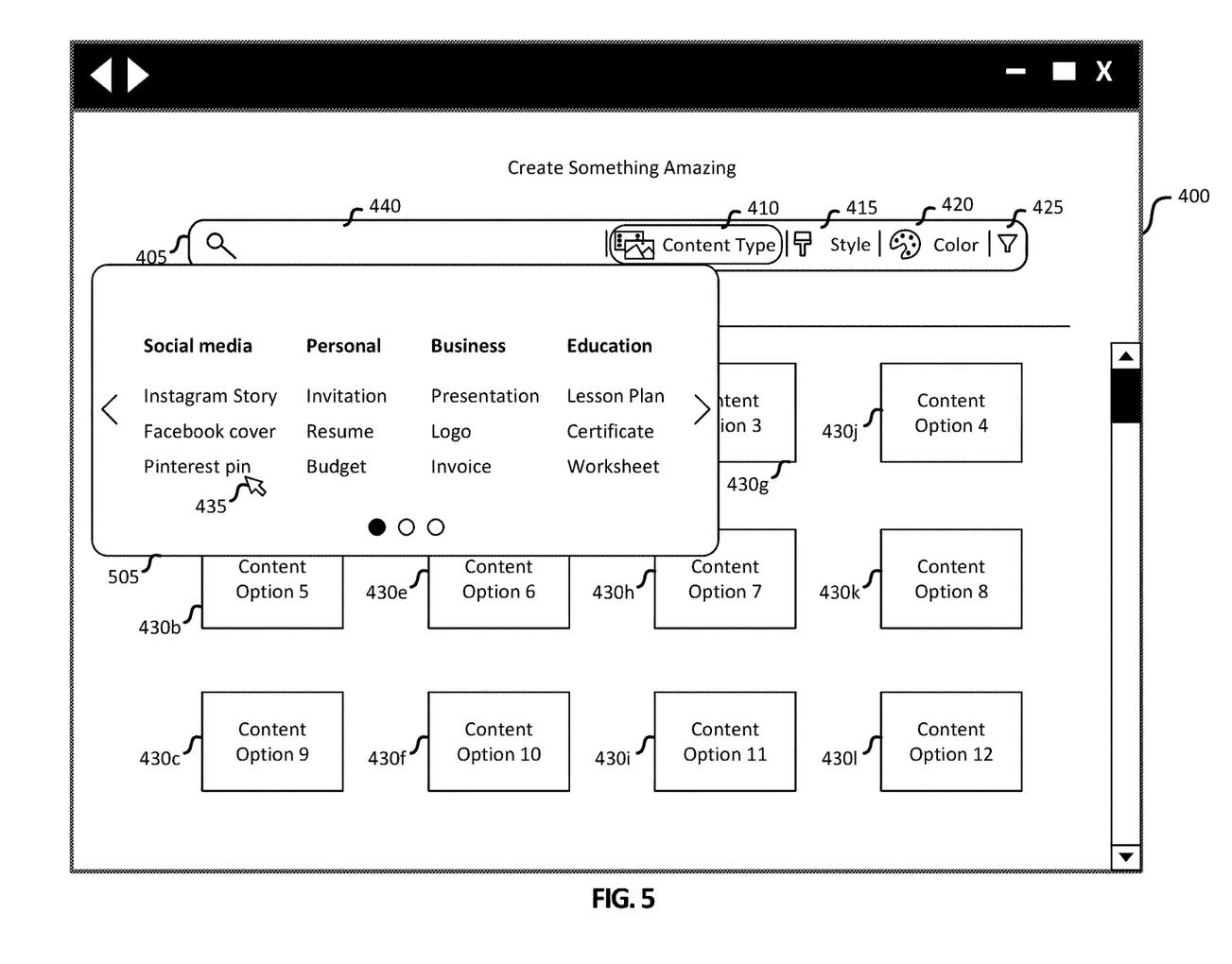
FIG. 5 illustrates another exemplary user interface incorporating a graphic search bar with responsive results, according to some embodiments.

FIG. 5 illustrates user interface 400 after the user selected the content type dropdown menu 410. In response to the selection of the content type dropdown menu 410, the dropdown menu 505 is displayed. Content types may include, for example, social media types of content such as Instagram® Story, Facebook® cover, or Pinterest® pin. Content types may also include personal types, business types, and education types. Other types may be included, and additional types may be found by scrolling left or right. In the depicted example, under education the options may include lesson plans, certificates, and worksheets. While depicted with example data, the options within dropdown menu 505 may be any options for filtering the content options 430. Selection arrow 435 may be used to select an option from dropdown menu 505. In the depiction of FIG. 5, selection arrow 435 may be selecting Pinterest® pin.

Figure 6:
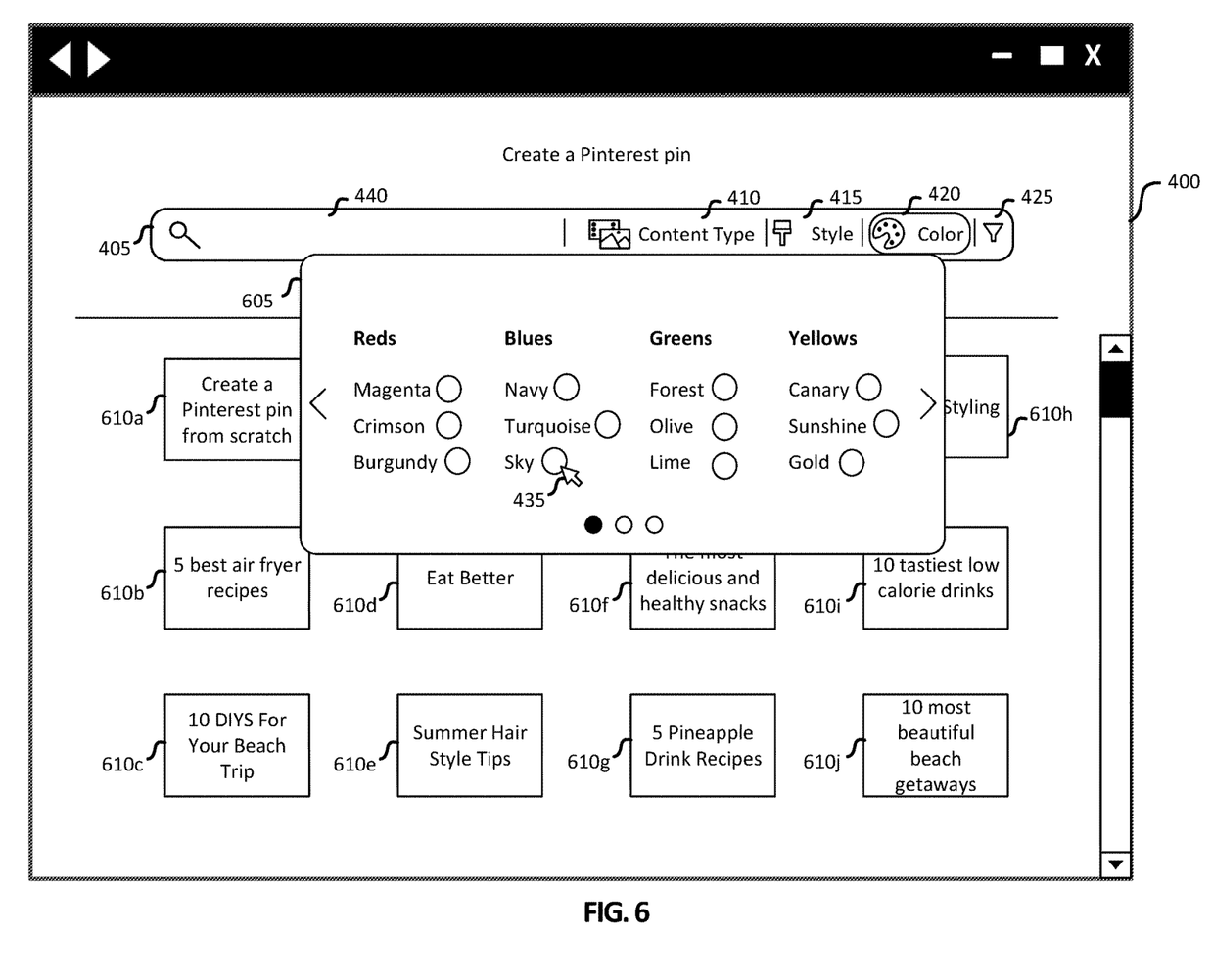
FIG. 6 illustrates another exemplary user interface incorporating a graphic search bar with responsive results, according to some embodiments.

FIG. 6 illustrates user interface 400 after the user selected Pinterest® pin and opened the color dropdown menu 420. In response to selecting Pinterest® pin in FIG. 5, the previously displayed content options 430 are replaced with search results 610 in real time in response to the selection as described above. Specifically, the selection may be provided to a cloud-based service such as application/service component 110 and passed to content and search bar configuration 115, which may use the selection to filter content from content repositories 130 and/or generate content with AI content generation 135 and return to the user. The user may then select the color dropdown menu 420 to select from. For example, under the color dropdown menu, the options may include reds, blues, green, and yellows. Additional options may be seen by scrolling left and right through the menu. Further, to provide visual context, a circle containing color representing the type may be provided. A circle is shown, but any visual cue for the color may be used. The color may be a gradient fill having multiple shades or colors that fit the color scheme for that selection. The selection arrow 435 may be selecting the color blue in the shade sky from the color dropdown menu 420.

Figure 7:
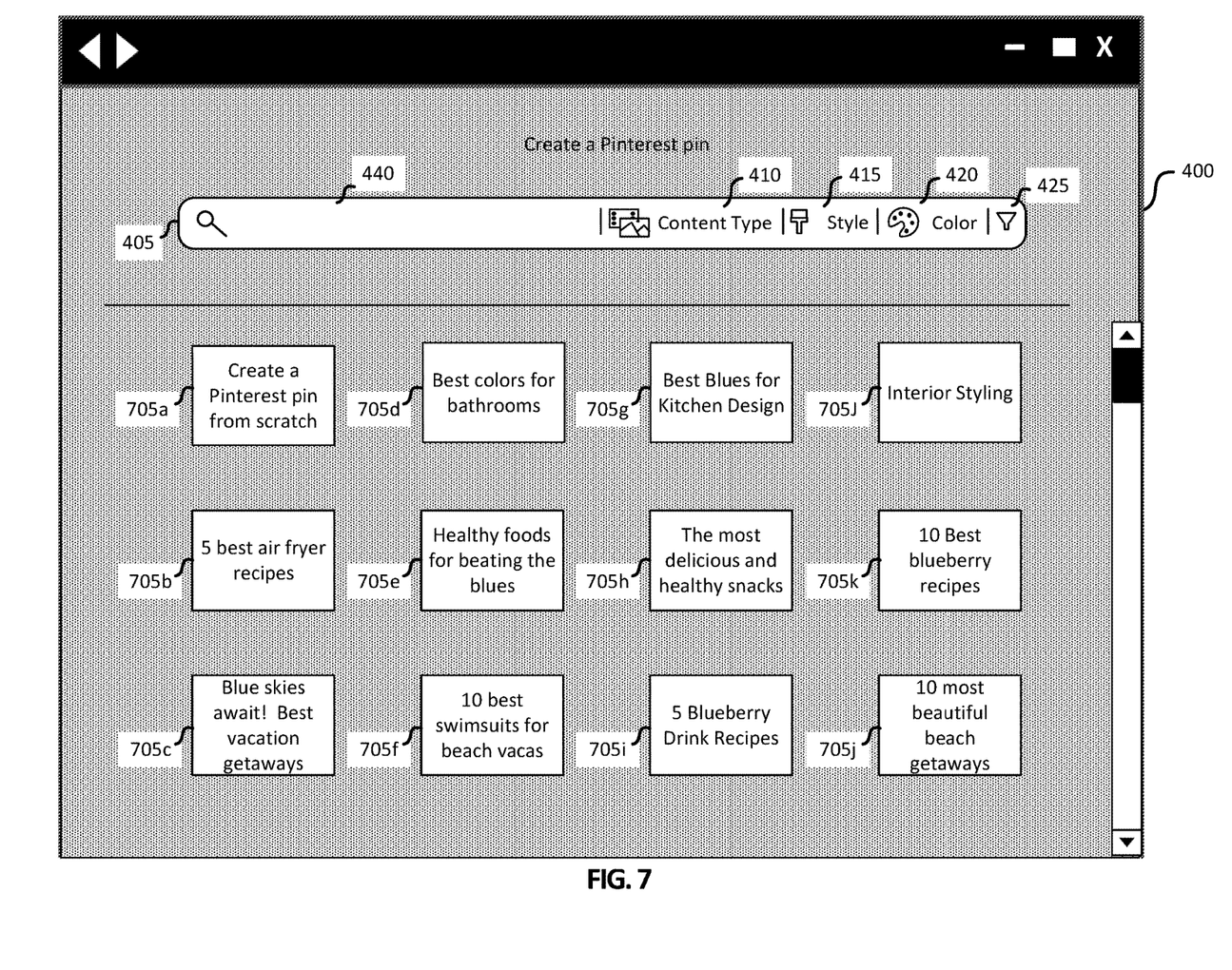
FIG. 7 illustrates another exemplary user interface incorporating a graphic search bar with responsive results, according to some embodiments.

FIG. 7 illustrates user interface 400 after the user selected the color scheme sky under blue. The search results 610 may be updated with the search results 705. The search results may include, for example, content that has the sky-blue color scheme and/or is otherwise related to the sky-blue selection. For example, content options that discuss the color may also be identified and provided in the search results 705. In some embodiments, some content items, such as 705b, may be the same topic as was previously shown, i.e., 605b, but have an updated color scheme. AI content generation 135 may generate such content, for example. Further, the searching environment may be updated to provide a general searching environment with a consistent aesthetic. For example, as depicted in FIG. 7, the shaded background of the user interface 400 indicates that the background has been updated with the sky-blue color scheme selected by the user. Header information may be updated as well. Such modifications are implemented immediately upon receipt of the selection.

Figure 8:
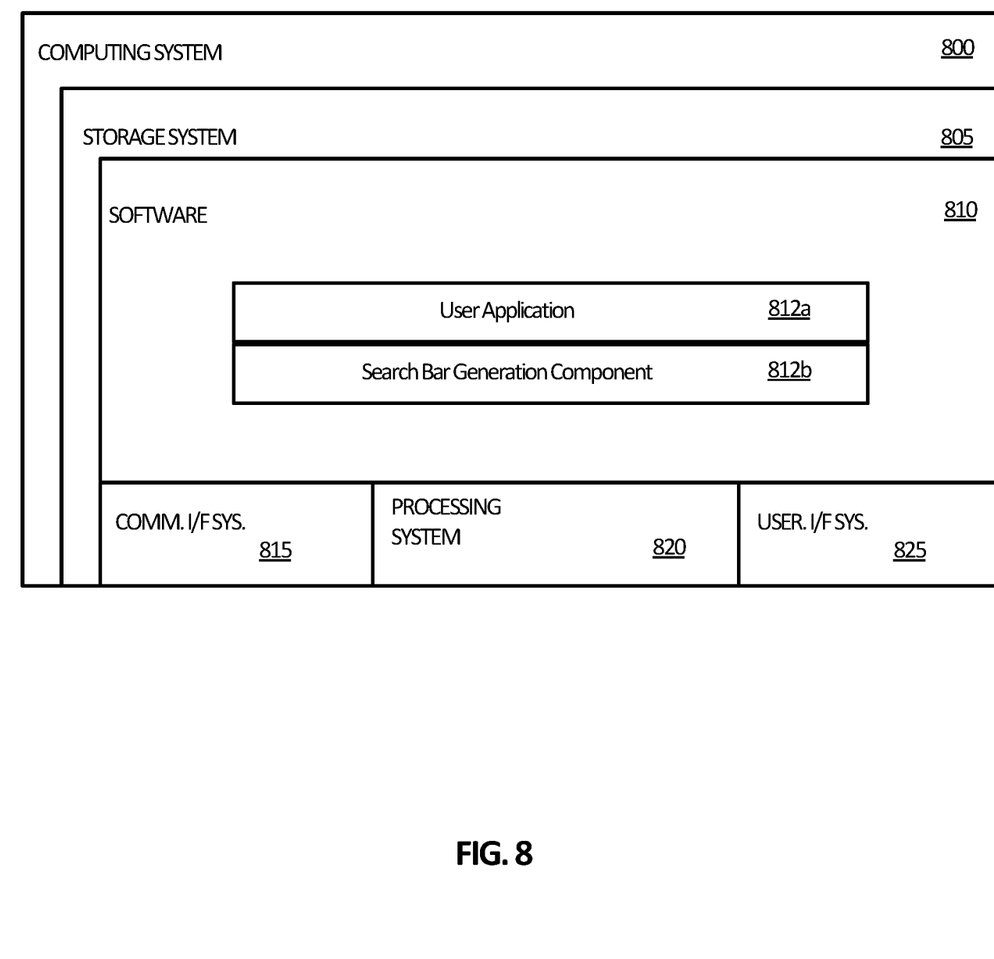
FIG. 8 illustrates an exemplary computing system with which aspects of this disclosure may be practiced.

FIG. 8 illustrates a computing system 800 suitable for implementing processing operations described herein related to graphic search bars with responsive results, with which aspects of the present disclosure may be practiced. As referenced above, computing system 800 may be configured to implement processing operations of any component described herein including the user system components (e.g., user application 140 and search bar generation 145 of FIG. 1). As such, computing system 800 may be configured as a specific purpose computing device that executes specific processing operations to solve the technical problems described herein including those pertaining to generation of graphic search bars with responsive results. Computing system 800 may be implemented as a single apparatus, system, or device or may be implemented in a distributed manner as multiple apparatuses, systems, or devices. For example, computing system 800 may comprise one or more computing devices that execute processing for applications and/or services over a distributed network to enable execution of processing operations described herein over one or more applications or services. Computing system 800 may comprise a collection of devices executing processing for front-end applications/services, back-end applications/services, or a combination thereof. Computing system 800 comprises, but is not limited to, a processing system 820, a storage system 805, software 810, communication interface system 815, and user interface system 825. Processing system 820 is operatively coupled with storage system 805, communication interface system 815, and user interface system 825. Non-limiting examples of computer system 800 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 820 loads and executes software 810 from storage system 805. Software 810 includes one or more software components (e.g., 812a, 812b) that are configured to enable functionality described herein. In some examples, computing system 800 may be connected to other computing devices (e.g., display device, audio devices, servers, mobile/remote devices, VR devices, AR devices, etc.) to further enable processing operations to be executed. When executed by processing system 820, software 810 directs processing system 820 to operate as described herein for at least the various processes, operational scenarios, and sequences discussed in the foregoing implementations. Computing system

800 may optionally include additional devices, features, or functionality not discussed for purposes of brevity. Computing system 800 may further be utilized as user equipment 105 or any of the cloud computing systems in system 100 (FIG. 1), method 200 (FIG. 2), method 300 (FIG. 3) and/or the accompanying description of FIGS. 4-7.

Referring still to FIG. 8, processing system 820 may comprise processor, a micro-processor and other circuitry that retrieves and executes software 810 from storage system 805. Processing system 820 may be implemented within a single processing device but may also be distributed across multiple processing devices or sub-systems that cooperate in executing program instructions. Examples of processing system 820 include general purpose central processing units, microprocessors, graphical processing units, application specific processors, sound cards, speakers and logic devices, gaming devices, VR devices, AR devices as well as any other type of processing devices, combinations, or variations thereof.

Storage system 805 may comprise any computer readable storage media readable by processing system 820 and capable of storing software 810. Storage system 805 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations, storage system 805 may also include computer readable communication media over which at least some of software 810 may be communicated internally or externally. Storage system 805 may be implemented as a single storage device but may also be implemented across multiple storage devices or sub-systems co-located or distributed relative to each other. Storage system 805 may comprise additional elements, such as a controller, capable of communicating with processing system 820 or possibly other systems.

Software 810 may be implemented in program instructions and among other functions may, when executed by processing system 820, direct processing system 820 to operate as described with respect to the various operational scenarios, sequences, and processes illustrated herein. For example, software 810 may include program instructions for executing one or more user applications 812*a* as described herein. Software 810 may also include program instructions for executing one or more sear bar generation components 812*b* for generating search bars with responsive results, as described herein.

In particular, the program instructions may include various components or modules that cooperate or otherwise interact to conduct the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 810 may include additional processes, programs, or components, such as operating system software, virtual machine software, or other application software. Software 810 may also comprise firmware or some other form of machine-readable processing instructions executable by processing system 820.

In general, software 810 may, when loaded into processing system 820 and executed, transform a suitable apparatus, system, or device (of which computing system 800 is representative) overall from a general-purpose computing system into a special-purpose computing system customized to execute specific processing components described herein as well as process data and respond to queries. Indeed, encoding software 810 on storage system 805 may transform the physical structure of storage system 805. The specific transformation of the physical structure may depend on various factors in different implementations of this description. Examples of such factors may include, but are not limited to, the technology used to implement the storage media of storage system 805 and whether the computer-storage media are characterized as primary or secondary storage, as well as other factors.

For example, if the computer readable storage media are implemented as semiconductor-based memory, software 810 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 815 may include communication connections and devices that allow for communication with other computing systems (not shown) over communication networks (not shown). Communication interface system 815 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 825 may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 825. In some cases, the input and output devices may be combined in a single device, such as a display capable of displaying images and receiving touch gestures. The aforementioned user input and output devices are well known in the art and need not be discussed at length here.

User interface system 825 may also include associated user interface software executable by processing system 820 in support of the various user input and output devices discussed above. Separately or in conjunction with each other and other hardware and software elements, the user interface software and user interface devices may support a graphical user interface, a natural user interface, or any other type of user interface, for example, that enables front-end processing and including rendering of, for example, user interfaces 400-700. Exemplary applications/services may further be configured to interface with processing components of computing system 800 that enable output of other types of signals (e.g., audio output, handwritten input) in conjunction with operation of exemplary applications/services (e.g., a collaborative communication application/service, electronic meeting application/service, etc.) described herein.

Communication between computing system 800 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

Figure 9:
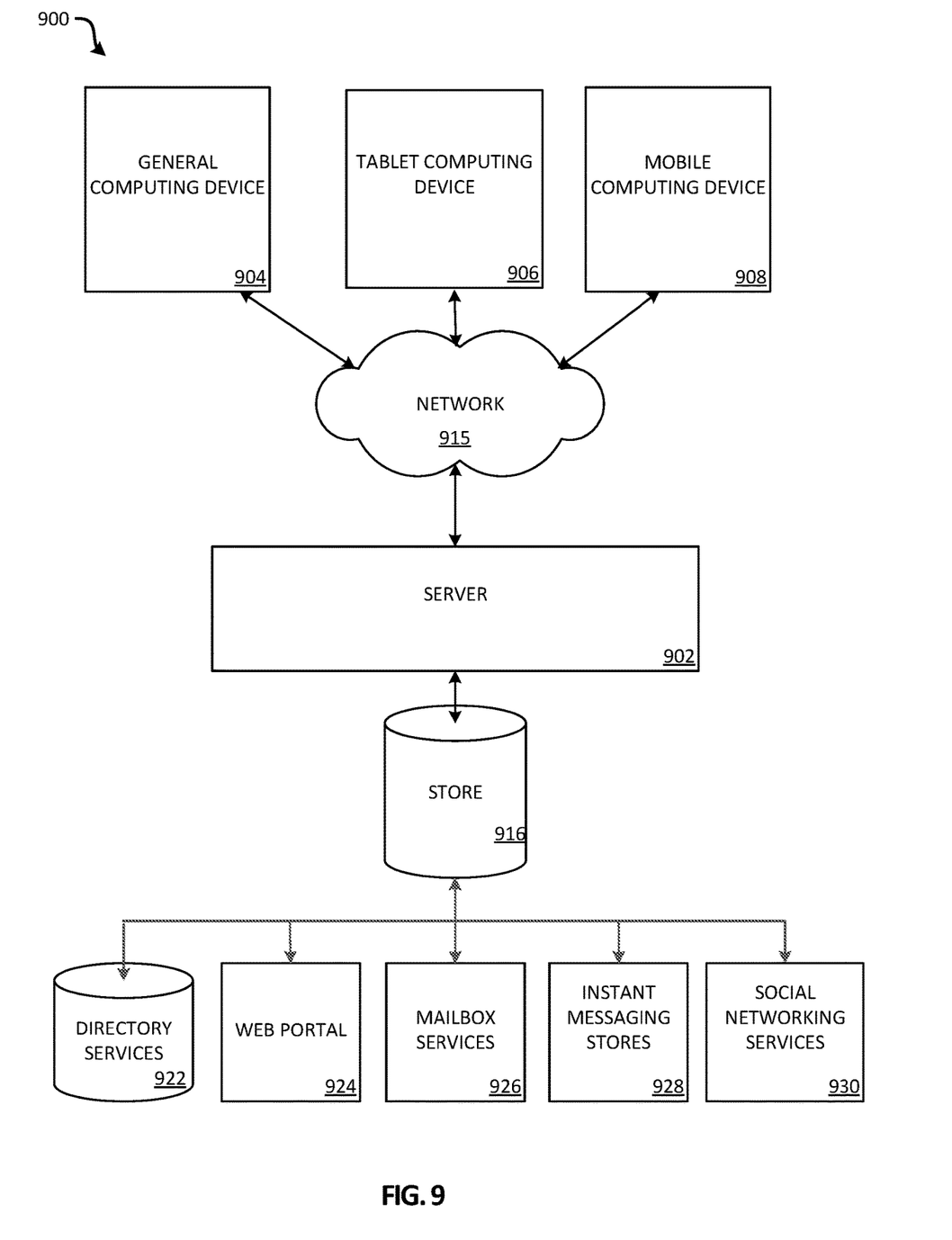
FIG. 9 is a simplified block diagram of a distributed computing system in which aspects of the present disclosure may be practiced

FIG. 9 illustrates an example distributed computing environment 900 illustrating one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The software components 812*a* and 812*b* may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer systems described herein may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method for providing a responsive searching environment, the method comprising:
   generating a search bar comprising:
   a text input area, and
   a plurality of dropdown menus, wherein each dropdown menu of the plurality of dropdown menus corresponds to an attribute of a plurality of attributes of templates, and each dropdown menu comprises a selectable list of attribute values;
   customizing the search bar, the customizing comprising providing user information associated with a user of the responsive searching environment as input to an artificial intelligence model and using an output to customize at least one of the plurality of dropdown menus;

rendering the customized search bar in an application that provides the templates having the plurality of attributes, wherein the templates are searchable using the search bar and are selected from a template repository for display to the user based on selected attribute values;

receiving a selection of a first attribute value from the selectable list of attribute values from a first dropdown menu of the plurality of dropdown menus, wherein the first dropdown menu is used to select a search value for a first attribute of the plurality of attributes;

in response to receiving the selection, generating search results by filtering the templates in real time based on the search value for the first attribute, wherein the search results comprise a subset of the templates having the search value for the first attribute;

rendering the search results comprising the subset of the templates for immediate display to a user;

receiving a second selection of a first template of the subset of templates;

in response to receiving the second selection, providing an input comprising the first template and selections from the one or more of the plurality of dropdown menus to a second artificial intelligence model trained to generate new templates based on the input;

receiving an output from the second artificial intelligence model comprising the new templates;

adding the new templates to the search results; and storing the new templates in the template repository.

2. The computer-implemented method of claim 1, further comprising:

receiving a third selection of a second attribute value from the selectable list of attribute values from a second dropdown menu of the plurality of dropdown menus;

in response to receiving the third selection, updating the search results by filtering the search results in real time based on the second attribute value; and rendering the updated search results for immediate display to the user.

3. The computer-implemented method of claim 1, wherein the input further comprises a logo of the user and at least one of the new templates incorporates the logo.

4. The computer-implemented method of claim 1, wherein the plurality of dropdown menus comprises:

the first dropdown menu comprising a selectable list of platform options;

a second dropdown menu comprising a selectable list of style options; and a third dropdown menu comprising a selectable list of color scheme options.

5. The computer-implemented method of claim 1, further comprising:

populating at least one of the plurality of dropdown menus using an artificial intelligence (AI) neural network to customize the search bar for the user.

6. The computer-implemented method of claim 1, further comprising:

receiving user configurations; and populating at least one of the plurality of dropdown menus using the user configurations.

7. The computer-implemented method of claim 6, wherein the user configurations comprise the attribute values for the selectable list of attribute values.

8. The computer-implemented method of claim 6, further comprising:

providing the user configurations to an artificial intelligence (AI) system;

receiving attribute values for the selectable list of attribute values as output from the AI system; and using the attribute values for the selectable list of attribute values to populate the at least one of the plurality of dropdown menus.

9. The computer-implemented method of claim 1, further comprising:

modifying, in real time, a background of a displayed page of the application based on the selection of the first attribute value.

10. The computer-implemented method of claim 1, wherein each of the plurality of dropdown menus comprises a type, and wherein the type of each of the plurality of dropdown menus is user configurable.

11. The computer-implemented method of claim 1, wherein each of the plurality of dropdown menus comprises a type, the method further comprising:

using output from an artificial intelligence (AI) system to select the type for each of the plurality of dropdown menus.

12. A system comprising:

one or more processors; and a memory having stored thereon instructions that, upon execution by the one or more processors, cause the one or more processors to:

generate a search bar comprising:

a text input area, and a plurality of dropdown menus, wherein each dropdown menu of the plurality of dropdown menus corresponds to an attribute of a plurality of attributes of templates, and each dropdown menu comprises a selectable list of attribute values;

customize the search bar, the customizing comprising providing user information associated with a user of a responsive searching environment as input to an artificial intelligence model and using an output to customize at least one of the plurality of dropdown menus;

render the customized search bar in an application that provides the templates having the plurality of attributes, wherein the templates are searchable using the search bar and are selected from a template repository for display to the user based on selected attribute values;

receive a selection of a first attribute value from the selectable list of attribute values from a first dropdown menu of the plurality of dropdown menus, wherein the first dropdown menu is used to select a search value for a first attribute of the plurality of attributes;

in response to receiving the selection, generate search results by filtering the templates in real time based on the search value for the first attribute, wherein the search results comprise a subset of the templates having the search value for the first attribute;

render the search results comprising the subset of the templates for immediate display to a user;

receive a second selection of a first template of the subset of templates;

in response to receiving the second selection, provide an input comprising the first template and selections from the one or more of the plurality of dropdown menus to a second artificial intelligence model trained to generate new templates based on the input;

receive an output from the second artificial intelligence model comprising the new templates;

add the new templates to the search results; and store the new templates in the template repository.

13. The system of claim 12, wherein the memory has stored further instructions that, upon execution by the one or more processors, cause the one or more processors to:

receive a third selection of a second attribute value from the selectable list of attribute values from a second dropdown menu of the plurality of dropdown menus;

in response to receiving the third selection, update the search results by filtering the search results in real time based on the second attribute value; and render the updated search results for immediate display to the user.

14. The system of claim 12, wherein the input further comprises a logo of the user and at least one of the new templates incorporates the logo.

15. The system of claim 12, wherein the plurality of dropdown menus comprises:

the first dropdown menu comprising a selectable list of platform options;

a second dropdown menu comprising a selectable list of style options; and a third dropdown menu comprising a selectable list of color scheme options.

16. The system of claim 12, wherein the memory has stored further instructions that, upon execution by the one or more processors, cause the one or more processors to:

populate at least one of the plurality of dropdown menus using an artificial intelligence (AI) system to customize the search bar for the user.

17. The system of claim 12, wherein the memory has stored further instructions that, upon execution by the one or more processors, cause the one or more processors to:

receive user configurations; and populate at least one of the plurality of dropdown menus using the user configurations.

18. The system of claim 12, wherein the memory has stored further instructions that, upon execution by the one or more processors, cause the one or more processors to:

modify, in real time, a background of a displayed page of the application based on the selection of the first attribute value.

19. The system of claim 12, wherein each of the plurality of dropdown menus comprises a type, and wherein the type of each of the plurality of dropdown menus is user configurable.

20. The system of claim 12, wherein each of the plurality of dropdown menus comprises a type, and wherein the memory has stored further instructions that, upon execution by the one or more processors, cause the one or more processors to:

use output from an artificial intelligence (AI) system to select the type for each of the plurality of dropdown menus.

* * * * *